(12) United States Patent
Ramsey et al.

(10) Patent No.: US 7,831,585 B2
(45) Date of Patent: Nov. 9, 2010

(54) EMPLOYMENT OF TASK FRAMEWORK FOR ADVERTISING

(75) Inventors: William D. Ramsey, Redmond, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 142 days.

(21) Appl. No.: 11/294,265

(22) Filed: Dec. 5, 2005

(65) Prior Publication Data

US 2007/0130124 A1 Jun. 7, 2007

(51) Int. Cl.
*G06F 17/30* (2006.01)
*G06F 15/16* (2006.01)

(52) U.S. Cl. .................. 707/708; 707/706; 705/14.1; 705/37

(58) Field of Classification Search ............ 705/14, 705/14.1, 37; 707/104.1, 1, 5, 708, 706
See application file for complete search history.

(56) References Cited

U.S. PATENT DOCUMENTS

| | | | |
|---|---|---|---|
| 4,736,296 A | 4/1988 | Katayama et al. |
| 4,965,763 A | 10/1990 | Zamora |
| 4,974,191 A | 11/1990 | Amirghodsi et al. |
| 5,208,816 A | 5/1993 | Seshardi et al. |
| 5,477,451 A | 12/1995 | Brown et al. |
| 5,577,241 A | 11/1996 | Spencer |
| 5,625,814 A | 4/1997 | Luciw |
| 5,636,036 A | 6/1997 | Ashbey |
| 5,696,962 A | 12/1997 | Kupiec |
| 5,748,974 A | 5/1998 | Johnson |
| 5,752,244 A | 5/1998 | Rose et al. |
| 5,754,173 A | 5/1998 | Hiura et al. |
| 5,754,174 A | 5/1998 | Carpenter et al. |
| 5,794,259 A | 8/1998 | Kikinis |
| 5,832,459 A | 11/1998 | Cameron et al. |
| 5,855,015 A | 12/1998 | Shoham |
| 5,892,900 A | 4/1999 | Ginter et al. |
| 5,999,948 A | 12/1999 | Nelson et al. |
| 6,088,700 A | 7/2000 | Larsen et al. |
| 6,118,939 A | 9/2000 | Nack et al. |

(Continued)

FOREIGN PATENT DOCUMENTS

| | | |
|---|---|---|
| EP | 1 571 578 A1 | 9/2005 |
| EP | 1 580 666 A2 | 9/2005 |
| WO | 0129823 A1 | 4/2001 |
| WO | 03001413 A1 | 1/2003 |
| WO | WO 2004/017230 A1 | 2/2004 |
| WO | WO 2005/036365 A2 | 4/2005 |

OTHER PUBLICATIONS

Google(tm), "Ad Words Reference Guide"; Nov. 30, 2004.*

(Continued)

*Primary Examiner*—Greta L Robinson
*Assistant Examiner*—Dennis Truong
(74) *Attorney, Agent, or Firm*—Merchant & Gould P.C.

(57) ABSTRACT

A task-based advertisement system and method are provided. The system employs high-order concepts (e.g., booking a flight, checking stock quotes etc.) embodied in "task(s)" which can then be bid upon by advertisers. The task(s) employed by the system are based upon a semantic solution to a natural-language query. The system includes a search engine that is capable of serving content in response to user query(ies). The system further includes a task server that can include hardware and/or software to retrieve task(s) in response to user query(ies). The task(s) retrieved by the task server can be presented to advertiser(s) who can bid on the task(s).

19 Claims, 14 Drawing Sheets

U.S. PATENT DOCUMENTS

| | | | |
|---|---|---|---|
| 6,212,494 B1 | 4/2001 | Boguraev | |
| 6,278,996 B1 | 8/2001 | Richardson et al. | |
| 6,314,398 B1 | 11/2001 | Junqua et al. | |
| 6,513,006 B2 | 1/2003 | Howard et al. | |
| 6,643,620 B1 | 11/2003 | Contolini et al. | |
| 6,675,159 B1 | 1/2004 | Lin et al. | |
| 6,678,677 B2 | 1/2004 | Roux et al. | |
| 6,678,694 B1 | 1/2004 | Zimmerman et al. | |
| 6,690,390 B1 | 2/2004 | Walters et al. | |
| 6,724,403 B1 | 4/2004 | Santoro et al. | |
| 6,751,606 B1 | 6/2004 | Fries et al. | |
| 6,816,857 B1* | 11/2004 | Weissman et al. | 707/5 |
| 6,850,252 B1 | 2/2005 | Hoffberg | |
| 6,901,399 B1 | 5/2005 | Corston et al. | |
| 6,904,402 B1 | 6/2005 | Wang et al. | |
| 6,910,003 B1 | 6/2005 | Arnold et al. | |
| 6,947,923 B2 | 9/2005 | Cha et al. | |
| 7,020,607 B2 | 3/2006 | Adachi | |
| 7,020,658 B1 | 3/2006 | Hill | |
| 7,328,199 B2 | 2/2008 | Ramsey et al. | |
| 7,523,099 B1 | 4/2009 | Egnor et al. | |
| 2002/0042793 A1 | 4/2002 | Choi | |
| 2002/0045463 A1 | 4/2002 | Chen et al. | |
| 2002/0049750 A1 | 4/2002 | Venkatram | |
| 2002/0059132 A1* | 5/2002 | Quay et al. | 705/37 |
| 2002/0065959 A1 | 5/2002 | Kim et al. | |
| 2002/0101448 A1 | 8/2002 | Sanderson | |
| 2002/0124115 A1 | 9/2002 | McLean et al. | |
| 2002/0143949 A1 | 10/2002 | Rajarajan et al. | |
| 2002/0152190 A1 | 10/2002 | Biebesheimer et al. | |
| 2003/0023598 A1* | 1/2003 | Janakiraman et al. | 707/10 |
| 2003/0078766 A1 | 4/2003 | Appelt | |
| 2003/0084035 A1 | 5/2003 | Emerick | |
| 2003/0120700 A1 | 6/2003 | Boudnik et al. | |
| 2003/0135584 A1* | 7/2003 | Roberts et al. | 709/218 |
| 2003/0222912 A1 | 12/2003 | Fairweather | |
| 2004/0030556 A1 | 2/2004 | Bennett | |
| 2004/0030697 A1 | 2/2004 | Cochran et al. | |
| 2004/0030710 A1 | 2/2004 | Shadle | |
| 2004/0034652 A1 | 2/2004 | Hofmann et al. | |
| 2004/0111419 A1 | 6/2004 | Cook et al. | |
| 2004/0117395 A1 | 6/2004 | Gong et al. | |
| 2004/0122674 A1 | 6/2004 | Bangalore et al. | |
| 2004/0130572 A1 | 7/2004 | Bala | |
| 2004/0148154 A1 | 7/2004 | Acero et al. | |
| 2004/0181749 A1 | 9/2004 | Chellapilla et al. | |
| 2004/0220893 A1* | 11/2004 | Spivack et al. | 706/46 |
| 2004/0236580 A1 | 11/2004 | Bennett | |
| 2004/0250255 A1 | 12/2004 | Kraiss et al. | |
| 2004/0260534 A1 | 12/2004 | Pak et al. | |
| 2004/0260689 A1* | 12/2004 | Colace et al. | 707/3 |
| 2004/0267725 A1* | 12/2004 | Harik | 707/3 |
| 2005/0027666 A1* | 2/2005 | Beck et al. | 707/1 |
| 2005/0028133 A1 | 2/2005 | Ananth et al. | |
| 2005/0034098 A1 | 2/2005 | DeSchryver et al. | |
| 2005/0044058 A1 | 2/2005 | Matthews et al. | |
| 2005/0049852 A1 | 3/2005 | Chao | |
| 2005/0049874 A1 | 3/2005 | Coffman et al. | |
| 2005/0065995 A1 | 3/2005 | Milstein et al. | |
| 2005/0075859 A1 | 4/2005 | Ramsey | |
| 2005/0075878 A1 | 4/2005 | Balchandran et al. | |
| 2005/0078805 A1 | 4/2005 | Mills et al. | |
| 2005/0080625 A1 | 4/2005 | Bennett et al. | |
| 2005/0080782 A1 | 4/2005 | Ratnaparkhi et al. | |
| 2005/0086059 A1 | 4/2005 | Bennett et al. | |
| 2005/0114854 A1 | 5/2005 | Padisetty et al. | |
| 2005/0131672 A1 | 6/2005 | Dalal et al. | |
| 2005/0132380 A1 | 6/2005 | Chow | |
| 2005/0137939 A1* | 6/2005 | Calabria et al. | 705/26 |
| 2005/0144064 A1* | 6/2005 | Calabria et al. | 705/14 |
| 2005/0144065 A1* | 6/2005 | Calabria et al. | 705/14 |
| 2005/0187818 A1* | 8/2005 | Zito et al. | 705/14 |
| 2005/0192992 A1 | 9/2005 | Reed | |
| 2005/0193055 A1 | 9/2005 | Angel et al. | |
| 2005/0216356 A1 | 9/2005 | Pearce et al. | |
| 2005/0228744 A1* | 10/2005 | McHale et al. | 705/37 |
| 2005/0246726 A1 | 11/2005 | Labrou | |
| 2005/0257148 A1 | 11/2005 | Goodman et al. | |
| 2005/0283473 A1 | 12/2005 | Rousso et al. | |
| 2006/0005207 A1 | 1/2006 | Louch et al. | |
| 2006/0059434 A1 | 3/2006 | Boss et al. | |
| 2006/0064302 A1 | 3/2006 | Ativanichayaphong et al. | |
| 2006/0107219 A1 | 5/2006 | Ahya et al. | |
| 2006/0156248 A1 | 7/2006 | Chaudhri et al. | |
| 2006/0179404 A1 | 8/2006 | Yolleck et al. | |
| 2006/0206835 A1 | 9/2006 | Chaudhri et al. | |
| 2007/0027850 A1* | 2/2007 | Chan et al. | 707/3 |
| 2007/0038614 A1* | 2/2007 | Guha | 707/4 |
| 2007/0038934 A1 | 2/2007 | Fellman | |
| 2007/0067217 A1* | 3/2007 | Schachter et al. | 705/14 |
| 2007/0100688 A1* | 5/2007 | Book | 705/14 |
| 2007/0101279 A1 | 5/2007 | Chaudhri et al. | |
| 2007/0101297 A1 | 5/2007 | Forstall et al. | |
| 2007/0106495 A1 | 5/2007 | Ramsey et al. | |
| 2007/0106496 A1 | 5/2007 | Ramsey et al. | |
| 2007/0124263 A1 | 5/2007 | Katariya et al. | |
| 2007/0130134 A1 | 6/2007 | Ramsey et al. | |
| 2007/0130186 A1 | 6/2007 | Ramsey et al. | |
| 2007/0192179 A1 | 8/2007 | Van Luchene | |
| 2007/0209013 A1 | 9/2007 | Ramsey et al. | |

OTHER PUBLICATIONS

International Search Report dated Mar. 29, 2007, mailed Mar. 30, 2007, for International Application No. PCT/US2006/044418, 3 pages.

U.S. Appl. No. 11/290,076, filed Nov. 30, 2005, Ramsey, et al.
U.S. Appl. No. 11/246,847, filed Oct. 7, 2005, Ramsey, et al.
U.S. Appl. No. 11/270,407, filed Nov. 9, 2005, Ramsey, et al.
U.S. Appl. No. 11/294,581, filed Dec. 5, 2005, Yao, et al.
U.S. Appl. No. 11/294,262, filed Dec. 5, 2005, Ramsey, et al.

"DTS: Programming: Creating the Custom Task Framework", 1 page, accessible at: http://msdn.microsoft.com/library/default.asp?url=/library/en-us/dtsprog/dtspcusttskc__3hwr.asp, last accessed Jan. 5, 2006.

Ernst, et al., "A Task Framework for the Web Interface W2H", Bioinformatics, 2003, pp. 278-282, vol. 19, No. 2, Oxford University Press.

Multi-Agent Systems Lab, "TAEMS: A Framework for Task Analysis, Environment Modeling, and Simulation", 3 pages, accessible at: http://dis.cs.umass.edu/research/taems/, last accessed Jan. 5, 2006.

Hochberg, et al., "A Flexible Framework for Developing Mixed-Initiative Dialog Systems", Association for Computational Linguistics, Proceedings of the Third SIGdial Workshop on Discourse and Dialog, Jul. 2002, pp. 60-63, Philadelphia.

AgileTek, "Componentized Architecture", 2 pages, accessible at: http://www.agiletek.com/agileplus#CompArchitecture, last accessed Jan. 5, 2006.

H. Lieberman, et al., "Instuctible Agents: Software That Just Keeps Getting Better", IBM Systems Journal, 1996, pp. 539-556, vol. 35, Nos. 3 and 4.

"Technial Forum: Machine Intellgience and the Turing Test", IBM Systems and Journal, 2002, pp. 524-539, vol. 41, No. 3.

O. Conlan, et al., "Applying Adaptive Hypermedia Techniques to Semantic Web Service Composition", In Proceedings of AH 2003: Workshop on Adaptive Hypermedia and Adaptive Web-based Systems, 2003, pp. 53-62.

H. Liu, et al., "GOOSE: A Goal-Oriented Search Engine with Commonsense", Adaptive Hypermedia and Adaptive Web-Based Systems, Second International Conference, AH 2002, Malaga, Spain, May 29-31, 2002, Lecture Notes in Computer Science, pp. 253-263, No. 2347.

Leon Peshkin, "Research Statement", 2 pages, accessible at: http://people.csail.mit.edu/pesha/my__res.pdf, last accessed Jan. 5, 2006.

Korns Associates "Our Intelligent Agents", 4 pages, accessible at: http://www.korns.com/technology.htm, last accessed Jan. 5, 2006.

V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.

Esposito, Dino, "Browser Helper Objects:The Broswer the Way You Want It." Microsoft Corporation, Jan. 1999, 12 pages.

Google Toolbar; "Revision History"; http://www.google.com/support/toolbar/bin/static.py?page=version_info.html; Dec. 11, 2000.

Mills, "Google Flight search takes off", http://www.news.com/Google-flight-search-takes-pff/2100-1038_3-5917821.html; Oct. 28, 2005.

Clarifying Search : A User-Interface Framework for Text Searches. Http://www.dlib.org/dlib/january97/retrieval/01shneiderman.html, Jan. 1997.

Free Microsoft Office Information Bridge Framework. Http://www.microsift.com/industry/government/InformationBridge.mspx, Mar. 29, 2005.

Usability for component Based Portals. http://www.128.ibm.com/developerworks/web/library/us-portal, Jun. 1, 2002.

OA Dated Jun. 30, 2008 for U.S. Appl. No. 11/270,407, 33 pages.

OA Dated Jun. 26, 2008 for U.S. Appl. No. 11/367,292, 35 pages.

OA Dated Jun. 16, 2008 for U.S. Appl. No. 11/270,393, 21 pages.

OA Dated May 13, 2008 for U.S. Appl. No. 11/294,265, 27 pages.

U.S. Non-Final Office Action cited in U.S. Appl. No. 11/246,847 mailed Oct. 18, 2006.

U.S. Final Office Action cited in U.S. Appl. No. 11/246,847 mailed Apr. 11, 2007.

U.S. Non-Final Office Action cited in U.S. Appl. No. 11/270,393 mailed Dec. 19, 2006.

U.S. Final Office Action cited in U.S. Appl. No. 11/270,393 mailed Jun. 4, 2007.

U.S. Non-Final Office Action cited in U.S. Appl. No. 11/270,393 mailed Nov. 20, 2007.

U.S. Non-Final Office Action cited in U.S. Appl. No. 11/270,393 mailed Mar. 2, 2009.

U.S. Final Office Action cited in U.S. Appl. No. 11/270,407 mailed Jan. 2, 2009.

U.S. Non-Final Office Action cited in U.S. Appl. No. 11/290,076 mailed Feb. 14, 2008.

U.S. Final Office Action cited in U.S. Appl. No. 11/290,076 mailed Sep. 19, 2008.

U.S. Non-Final Office Action cited in U.S. Appl. No. 11/290,076 mailed Jun. 9, 2009.

U.S. Non-Final Office Action cited in U.S. Appl. No. 11/294,262 mailed Nov. 28, 2007.

U.S. Final Office Action cited in U.S. Appl. No. 11/294,262 mailed May 13, 2008.

U.S. Non-Final Office Action cited in U.S. Appl. No. 11/294,262 mailed Sep. 22, 2008.

U.S. Final Office Action cited in U.S. Appl. No. 11/294,262 mailed Mar. 12, 2009.

U.S. Non-Final Office Action cited in U.S. Appl. No. 11/294,262 mailed Aug. 21, 2009.

U.S. Non-Final Office Action cited in U.S. Appl. No. 11/294,581 mailed Nov. 28, 2007.

U.S. Non-Final Office Action cited in U.S. Appl. No. 11/294,581 mailed May 13, 2008.

U.S. Final Office Action cited in U.S. Appl. No. 11/294,581 mailed Feb. 5, 2009.

U.S. Non-Final Office Action cited in U.S. Appl. No. 11/294,581 mailed Jun. 23, 2009.

U.S. Non-Final-Office-Action cited in U.S. Appl. No. 11/367,292 mailed Dec. 10, 2008.

U.S. Final Office Action cited in U.S. Appl. No. 11/367,292 mailed Jun. 12, 2009.

U.S. Final Office Action cited in U.S. Appl. No. 11/294,581 mailed Dec. 30, 2009.

International Search Report mailed Apr. 11, 2007 in Application No. PCT/US2006/043663.

U.S. Non-Final Office Action cited in U.S. Appl. No. 11/367,292 mailed Feb. 23, 2010.

U.S. Final Office Action cited in U.S. Appl. No. 11/294,262 mailed Apr. 1, 2010.

* cited by examiner

EMPLOYMENT OF TASK FRAMEWORK FOR ADVERTISING

CROSS REFERENCE TO RELATED APPLICATIONS

This application is related to co-pending U.S. patent application Ser. No. 11/270,407, filed Nov. 9, 2005, and entitled, "ADAPTIVE TASK FRAMEWORK", co-pending U.S. patent application Ser. No. 11/270,393, filed Nov. 9, 2005, and entitled, "ADAPTIVE TASK FRAMEWORK", and, co-pending U.S. patent application Ser. No. 11/290,076, filed Nov. 30, 2005, and entitled, "ADAPTIVE SEMANTIC REASONING ENGINE"The entirety of the aforementioned applications is hereby incorporated by reference.

BACKGROUND

Human languages are rich and complicated, including huge vocabularies with complex grammar and contextual meaning. Machine interpretation of human language, even in a very limited way, is an extremely complex task and continues to be the subject of extensive research. Providing users with the ability to communicate their desires to an automated system without requiring users to learn a machine specific language or grammar would decrease learning costs and greatly improve system usability. However, users become quickly frustrated when automated systems and machines are unable to interpret user input correctly, resulting in unexpected results.

Natural language input can be useful for a wide variety of applications, including virtually every software application with which humans are intended to interact. Typically, during natural language processing the natural language input is separated into tokens and mapped to one or more actions provided by the software application. Each application can have a unique set of actions. Consequently, it can be both time-consuming and repetitive for software developers to draft code to interpret natural language input and map the input to the appropriate action for each application.

The Internet in particular has provided users with a mechanism for obtaining information regarding any suitable subject matter. For example, various web sites are dedicated to posting text, images, and video relating to world, national, and/or local news. A user with knowledge of a Uniform Resource Locator (URL) associated with one of such web sites can simply enter the URL into a web browser to be provided with the web site and access content thereon. Another conventional manner of locating desired information from the Internet is through utilization of a search engine. For instance, a user can enter a word or series of words into a search field and thereafter initiate the search engine (e.g., through depression of a button, one or more keystrokes, voice commands, . . . ). The search engine then utilizes search algorithms to locate web sites related to the word or series of words entered by the user into the search field, and the user can then select one of the web sites returned by the search engine to review content therein.

As more and more people have begun to utilize the Internet, it has become apparent that revenue opportunities exist for small and large businesses alike. For instance, many retail companies utilize the Internet to sell goods online, thereby reducing costs associated with managing and maintaining a store location, providing an ability to centralize inventory, and various other similar benefits that result in decreased costs that are passed on to customers. Given this increased use of the Internet for generating business and/or revenue, it has also become apparent that the Internet can be utilized as an advertising mechanism. In one example, an individual who enters the key word "flower" into a search engine may be interested in purchasing flowers—thus, it is beneficial for a company that sells flowers to advertise to that user at the point in time that the user is searching for the aforementioned term. Oftentimes users will see the advertisements and click on such advertisements to purchase flowers, thereby creating business for the flower retailer. Furthermore, the search engine is provided with additional revenue by selling advertisement space for a particular period of time to the flower retailer when the term "flower" is utilized as a search term. In a similar example, a sporting goods company may wish to display advertisements on a web site related to sports, and can purchase advertising space for a limited amount of time on the web site. Again, the buying and selling of advertising space can lead to increased revenue for an owner of the web site as well as the advertiser.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A task-based advertisement system and method are provided. The system employs high-order concepts (e.g., booking a flight, checking stock quotes etc.) embodied in "task(s)" which can then be bid upon by advertisers. Conventionally, advertisements have been relatively static with respect to a user's query so that a query such as "flights from Boston to Seattle" surfaces ads that correspond to keyword(s) purchased by the advertiser but are not derived semantically from the query. To the contrary, the task(s) employed by the system are based upon a semantic solution to a natural-language query. Thus, the system can lower the barrier to entry for advertiser(s), since instead of coming up with a comprehensive list of keyword(s), the advertiser(s) can bid on "tasks" instead. Additionally, with the system, user(s) can enter more complex queries and obtain better results than with conventional keyword-based system(s). Further, advertiser(s) can provide material that is targeted to the user based upon the semantic content in the task (e.g., user provided with more relevant content).

The system includes a search engine that is capable of serving content in response to user query(ies) (e.g., Internet search engine). The system further includes a task server that can include hardware and/or software to retrieve task(s) in response to user query(ies). The task(s) retrieved by the task server can be presented to advertiser(s) who can bid on the task(s). For example, the advertiser(s) can have a financial incentive to provide better content to user(s).

The task server provides the search engine with a standardized method for interpreting natural language input. A task, as used herein, describes and defines a fundamental unit of action relevant to user. Task(s) may be defined using extended markup language (XML), databases, text files or in any other suitable manner.

The search engine can receive any manner of natural language input (e.g., handwritten text, tablet input, speech and typed text). The search engine can process the natural language input to generate a query for processing by the task server (e.g., a simple string of text characters). The task server selects one or more tasks based, at least in part, upon the query. The task server can provide the task along with associated metadata and slot information to describe an action to the search engine.

Overall, the task server is responsible for receiving an input query, finding a set of likely task(s) given the input query, filling out slot values given a task and the input query, retrieving the most likely tasks with the most like slot values. Optionally, the task server can receive user feedback data to update model(s).

In one example, the system is based on a closed set of tasks (e.g., predefined tasks). One or more advertiser(s) bid on task(s). In another example, in addition to a set of predefined tasks, advertiser(s) can bid on and construct their own tasks, for example, when a suitable task does not exist.

An advantage of bidding on a task rather than keyword(s) (as in conventional systems) is that keyword bidding requires advertisers to bid on every possible city. With conventional systems, advertiser(s) are not presented with contextual information to understand the difference between "arrival" and "departure" cities. With tasks, advertiser(s) are presented with contextual information which can assist the advertiser(s) to target their advertisement(s) to particular task(s).

In response to a query received from a user, the task server returns a list of the most likely task(s) given the query to the search engine. The search engine can then provide the task(s) to the advertiser(s) for review and bidding. Thereafter, zero, one or more advertiser(s) can bid on the task(s), for example, with indicia that the particular advertiser is willing to pay for the right to display an ad based, at least in part, on the task(s) (e.g., amount of money, credits and the like).

The advertiser(s) can also provide information regarding advertisement(s) that are to be displayed to the user, in the event that the advertiser is a successful bidder on the task. For example, the advertiser can use an identifier to select from stored advertisements accessible by the search engine. Additionally and/or alternatively, the advertiser can dynamically provide advertisement(s) that are to be displayed to the user, in the event that the advertiser is a successful bidder on the task.

When the task is returned from the task server, the advertisement may not be ready for display for various reasons. In one example, the task can be an XML packet which is sent to advertiser(s) by the search engine. Advertiser(s) that desire to bid on the task can then send back a data packet (e.g., HTML) that includes information to be displayed to the user, in the event the advertiser is a successful bidder. The advertisers can then return an HTML blob containing whatever information they deem relevant given the task. For example, a particular advertiser might include a banner ad with parameters embedded in the links so that the site can be pre-populated with information if the user clicks it. A second advertiser might query their database to return instances of flights so that they can display "flights leaving tomorrow starting at $299" or display a list of flights to the user. Yet other advertisers might choose not to display anything either because supply is limited or for other reasons. Significantly, the advertiser controls the content that's display in this example.

In another example, a link (e.g., URL) can be constructed by the search engine without having to contact the advertiser(s) directly. In this example, the, the advertiser is responsible for filling out a template such that the results cab be rendered by the search engine. Significantly, in both examples, the advertiser can be notified about the semantics of the query and therefore is able to provide more targeted advertisements.

Optionally, the task retrieval process of the task server can improve with user feedback. For example, feedback can be based on the click-through data stage (e.g., which advertisement was selected by the user). Additionally and/or alternatively, feedback can be based on intent data, that is, what the user did once they receive the advertiser's advertisement.

The click-through data can be obtained by logging which advertisement was clicked and whether it was the last advertisement clicked. A query classifier model can then be built that attempts to surface the best tasks given the query. This can be expressed mathematically using the Naïve Bayes approximation as $P(Task|Query) \sim P(Task)*\Pi P(term|Task)$. Additionally, intent data can be employed to train the slot-filling models that determine the best mapping.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
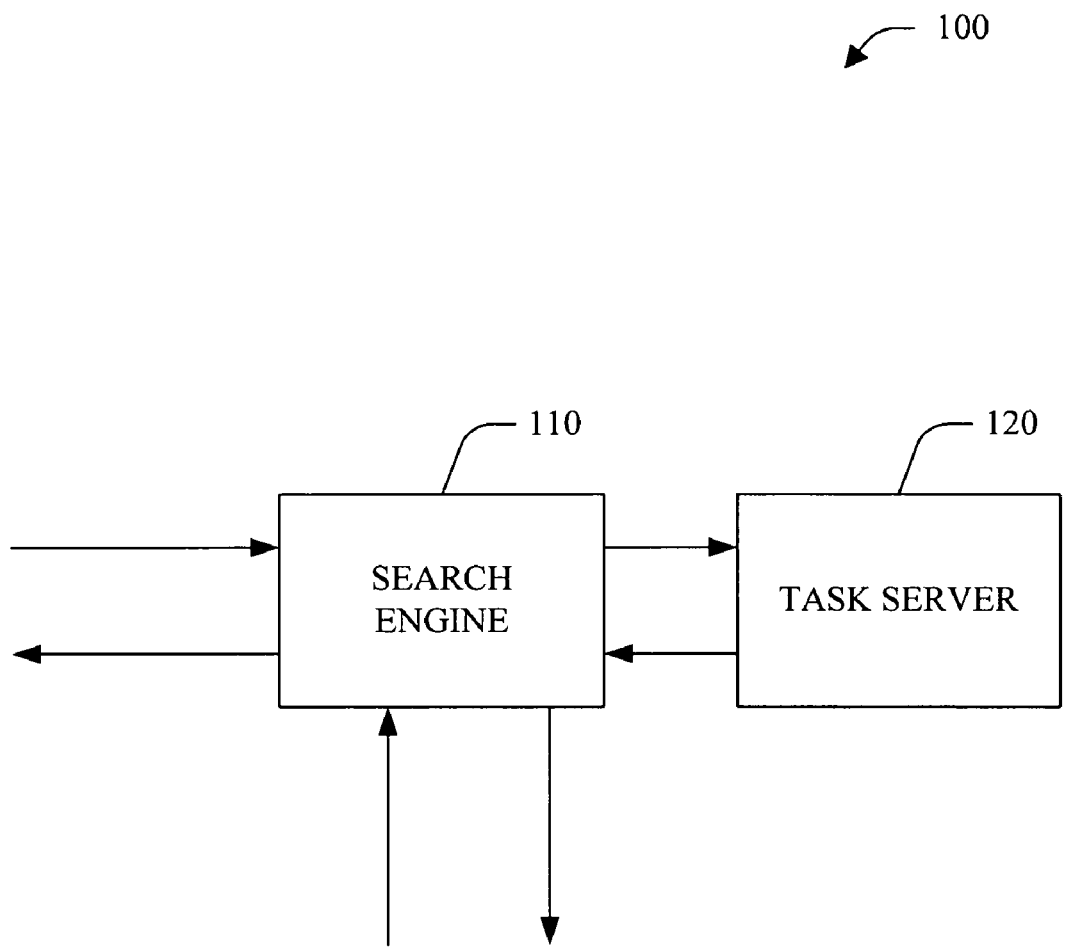
FIG. 1 is a block diagram of a task-based advertisement system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, a task-based advertisement system 100 is illustrated. The system 100 employs high-order concepts (e.g., booking a flight, checking stock quotes etc.) embodied in "task(s)" which can then be bid upon by advertisers.

Conventionally, advertisements have been relatively static with respect to a user's query so that a query such as "flights from Boston to Seattle" surfaces ads that correspond to keyword(s) purchased by the advertiser but are not derived semantically from the query. To the contrary, the task(s) employed by the system 100 are based upon a semantic solution to a natural-language query. Thus, the system 100 can lower the barrier to entry for advertiser(s), since instead of coming up with a comprehensive list of keyword(s), the advertiser(s) can bid on "tasks" instead. Additionally, with the system 100, user(s) can enter more complex queries and obtain better results than with conventional keyword-based system(s). Further, advertiser(s) can provide material that is targeted to the user based upon the semantic content in the task (e.g., user provided with more relevant content).

Figure 2:
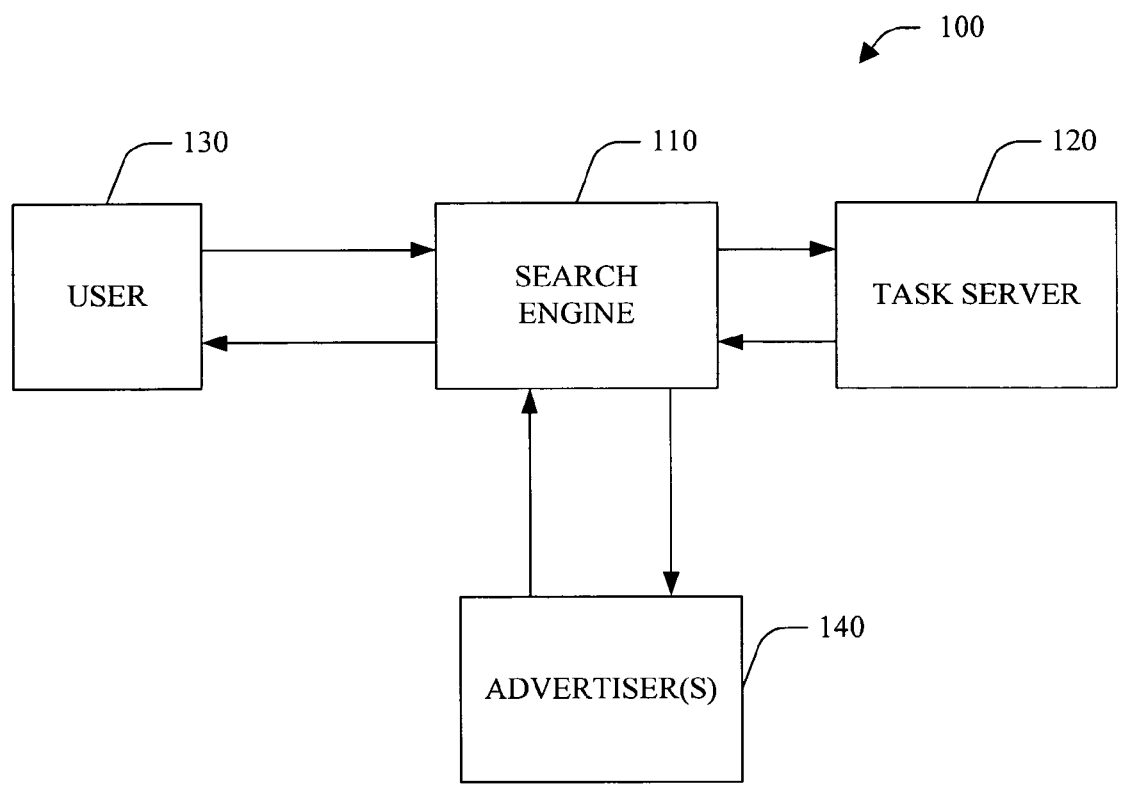
FIG. 2 is a block diagram of a task-based advertisement system.

Referring briefly to FIG. 2, the system 100 includes a search engine 110 that is capable of serving content in response to user 130 query(ies) (e.g., Internet search engine). The system 100 further includes a task server 120 that can include hardware and/or software to retrieve task(s) in response to user query(ies). The task(s) retrieved by the task server 120 can be presented to an advertiser(s) 140 who can bid on the task(s). For example, the advertiser(s) 140 can have a financial incentive to provide better content to user(s) 130.

Search Engine 110

The search engine 110 can receive query(ies) from user(s) 130 and provide result(s), if any, to the user(s). Thus, the search engine 110 can provide a place where user(s) 130 can express their intentions in the form of query(ies) with the search engine 110 returning a result set comprising web site(s) that will likely meet the user's wishes. Additionally, the search engine 110 can present targeted advertisement(s) based, at least in part, upon the user 130's query(ies), as discussed below. The targeted advertisement(s) can be employed, for example, to generate revenue for entity(ies) associated with the search engine 110.

Task Server 120

The task server 120 provides the search engine 110 with a standardized method for interpreting natural language input. Additionally, the task server 120 can provide application developer(s) with a standard manner of defining the tasks the search engine 110 is capable of performing. A task, as used herein, describes and defines a fundamental unit of action relevant to user. The task server 120 enables the search engine 110 to define and manage tasks. Task(s) may be defined using extended markup language (XML), databases, text files or in any other suitable manner.

The search engine 110 can receive any manner of natural language input (e.g., handwritten text, tablet input, speech and typed text). The search engine 110 can process the natural language input to generate a query for processing by the task server 120 (e.g., a simple string of text characters). The task server 120 selects one or more tasks based, at least in part, upon the query. The task server 120 can provide the task along with associated metadata and slot information to describe an action to the search engine 110.

Figure 3:
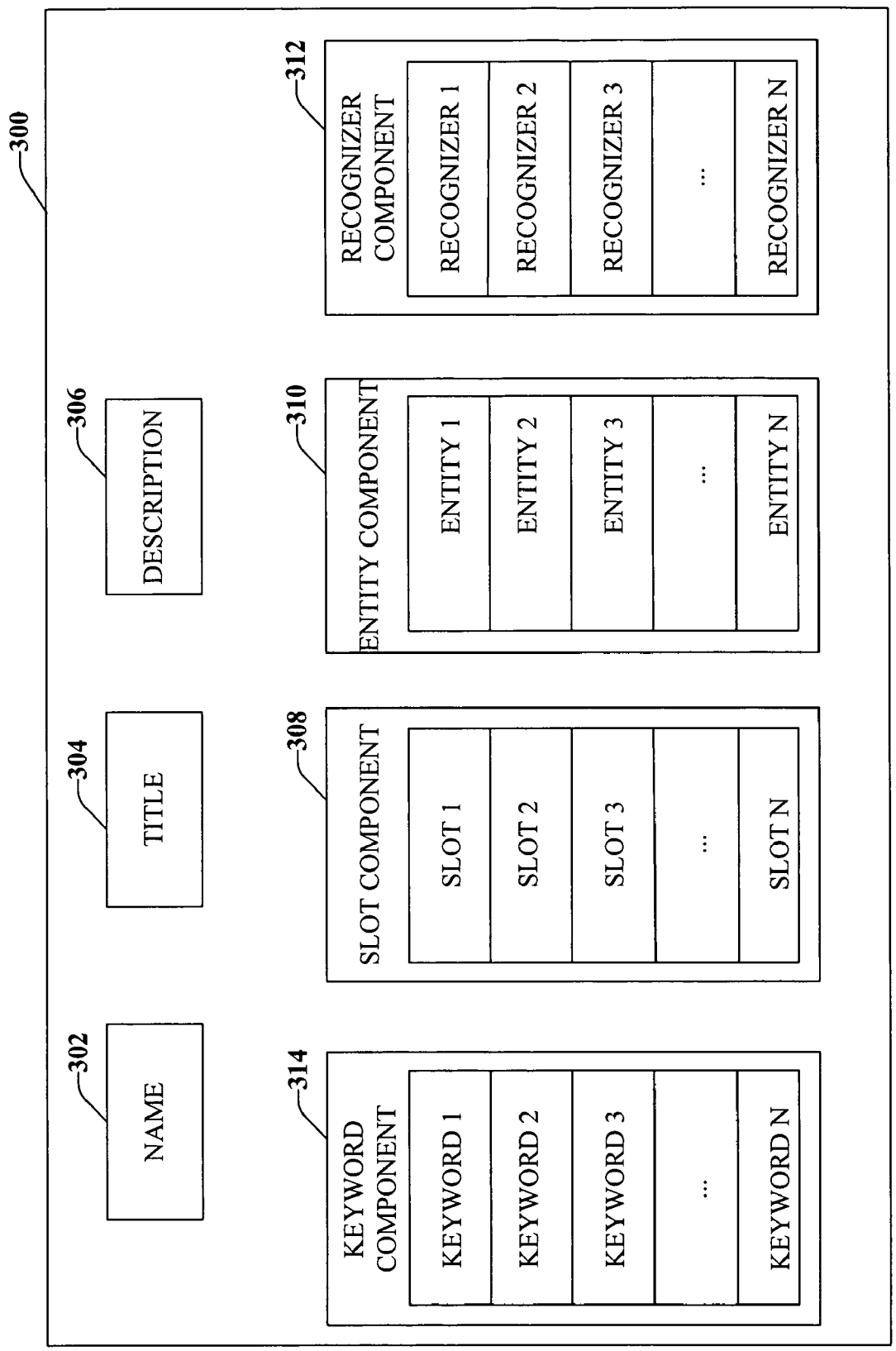
FIG. 3 is a diagram of an exemplary task.

Overall, the task server 120 is responsible for:
Receiving an input query;
Finding a set of likely tasks given the input query;
Filling out slot values given a task and the input query;
Retrieving the most likely tasks with the most like slot values; and,
(optionally) Receiving feedback data to learn from user feedback Referring to FIG. 3, an exemplary task 300 is illustrated. The task 300 can be generated by the task server 120 in response to a user's query. For example, the task 300 can include a name 302 that identifies the task 300 (e.g., a task for booking airline flights may be named "BookFlight"). The task 300 can also include a title 304, for example, that can be displayed to users. Additionally, the task 300 can include a description 306 that briefly describes the task 300. The description 306 can be displayed to users either to allow the users to select the appropriate task 300 or confirm that the appropriate task 300 has been selected. For example, the name, title and description can be implemented using alphanumeric text strings.

The task 300 can include an entity component 310. The entity component 310 can include one or more named entities. A named entity, as used herein, is a token that is known to have a specific meaning. The named entity can be task specific or can be utilized with multiple tasks. The task 300 can include a named entity (NE) recognizer component 312. The NE recognizer component 312 can include one or more recognizers capable of matching tokens or portions of the natural language input to the entities included in the entity component 310. The NE recognizers 312 are capable of recognizing tokens corresponding to the named entities contained within the entities component 310. These tokens have a specific task meaning. Recognizers may be general or may be specific to a certain category of tokens. For example, a city recognizer may include a list of names (e.g., Seattle, Boston). Similarly, a date recognizer may be capable of recognizing and interpreting dates, such as "Jun. 14, 2005." The software developer may define certain recognizers when specifying a task.

The task 300 can also include a keyword component 314. The keyword component 314 can include one or more keywords. Keywords can be used to select a task 300 from a set of tasks. For example, the "BookFlight" task keyword component 314 can include keywords such as "Book Flight," "airline" and the like. The keywords can be determine by the software developer or automatically generated by the task server 120. In addition, the task server 120 can add additional keywords to the keyword component 314 based upon natural language input, user actions and/or user feedback. Furthermore, the keywords may be weighted, such that the presence of certain keywords in the query is more likely to surface certain tasks. Such weight can also be used to rank or order a selected group of tasks.

The task 300 can also include a slot component 308 that specifies or defines slots for information required for the task. The slot component 308 can provide a mechanism for defining parameters used by the task. For example, a task that books airline flights may include slots for the arrival city, the departure city, the flight date and time. The slot component 308 can include any integer number of slots, from zero to N. Typically, information from the natural language input is used to fill the slots.

Figure 4:
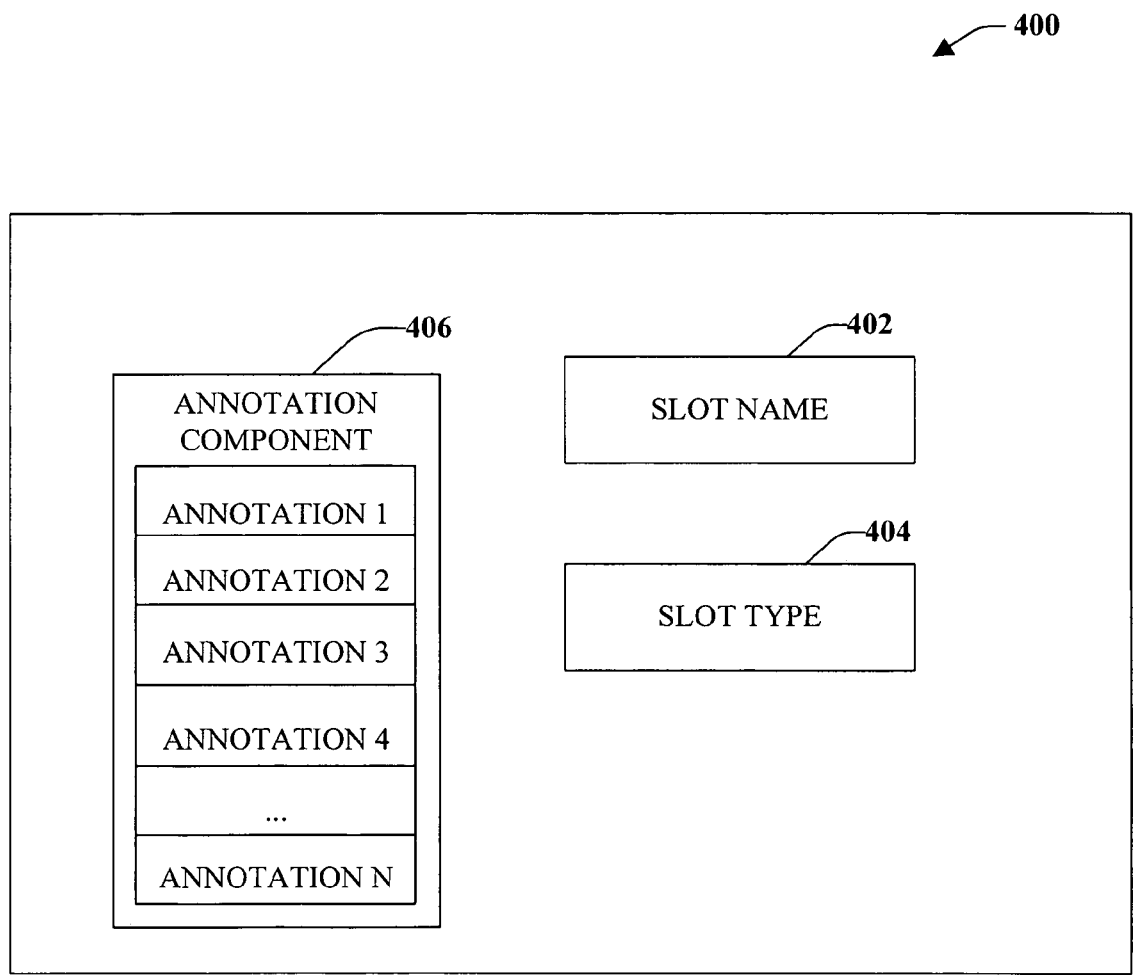
FIG. 4 is a diagram of an exemplary slot.

Turning next to FIG. 4, an exemplary slot 400 is illustrated. A slot 400 can include a slot name 402 that identifies the slot 400. For example, the BookFlight task discussed above can include slots named "DestinationCity," "ArrivalCity" and "Date." The slot 400 can also include a slot type 404. Slot type 404 indicates the type of the value of the slot data. Types can include integers, real numbers, textual strings and enumerated types (e.g., type "City" can include a list of city names).

The slot 400 can also include an annotation component 406. The annotation component 406 can include one or more annotations. Annotations are tokens that mark or indicate the significance of other tokens. The annotation component 406 identifies an annotation token and uses that information to interpret other tokens within the natural language input. For example, the token "from" when contained within a natural language input string that maps to a "BookFlight" task indicates that the token that follows is likely to contain the name of the departure city. Annotations may appear either before or after the relevant token. For example, the token "departure city" when contained within a natural language input string that maps to a "BookFlight" task indicates that the token that precedes it is likely to contain the name of the departure city. Consequently, the phrase "leaving from Boston" and "Boston departure city" can both be interpreted to fill the departure city slot with the value "Boston." Annotations which appear before the token are called pre-indicators, while annotations which follow the relevant token are called post-indicators. The annotation component 406 can recognize task system defined annotations as well as task specific annotations.

Figure 5:
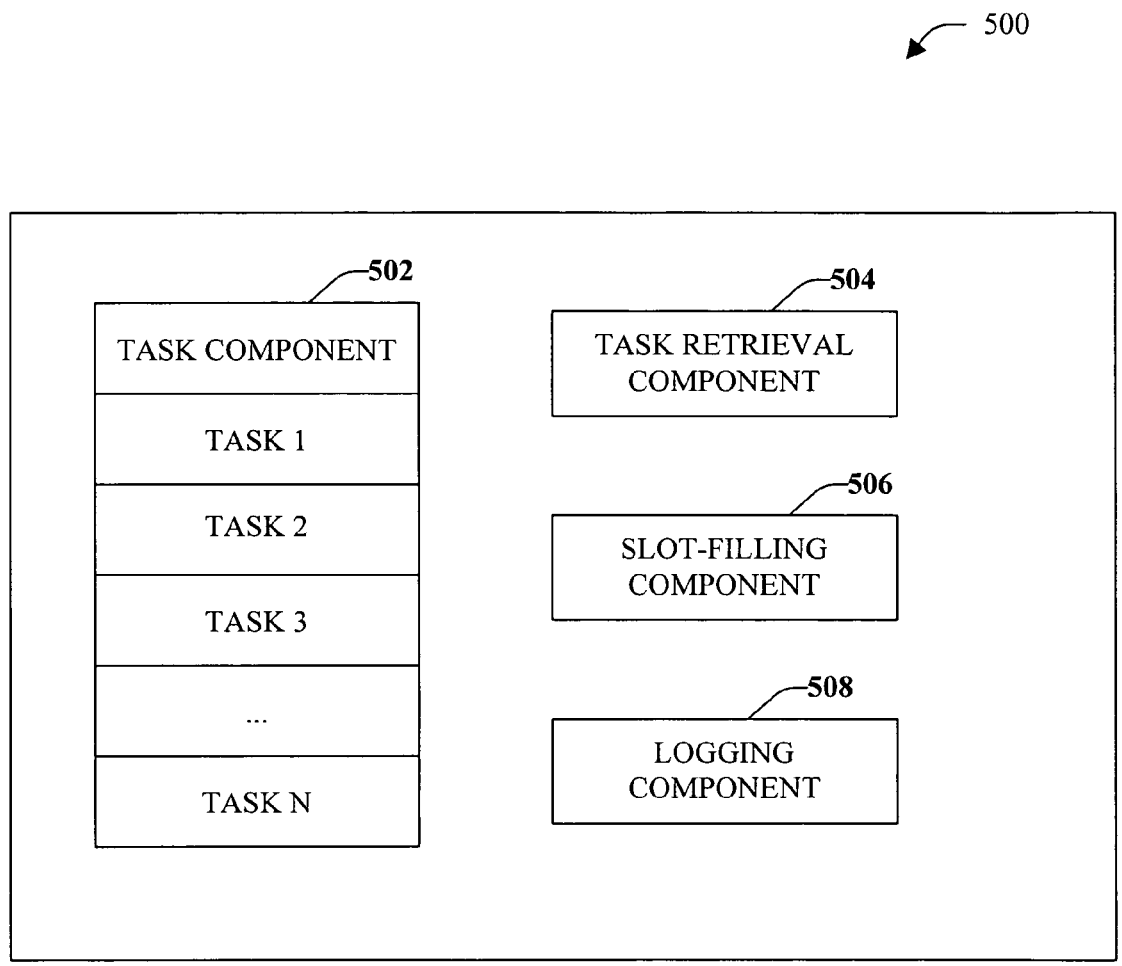
FIG. 5 is a block diagram of an exemplary task framework.

Next, referring to FIG. 5, an exemplary task framework 500 is illustrated. The framework 500 can include a task component 502 that includes one or more tasks, as described previously. The framework 500 can be a component of the task server 120.

Tasks can be generated by one or more applications or tasks can be generated automatically by the task framework 500. In addition, the task framework 500 may update or modify tasks generated by application(s). The task component 502 can be a flat file, a database or any other structure suitable for containing the data for one or more tasks.

The task framework 500 can include a task retrieval component 504. The task retrieval component 504 uses the query to select one or more tasks from the collection of tasks contained within the task component 502. The task retrieval component 504 may determine the appropriate task to be retrieved from the task component 502 based upon keywords in the query. The collection of tasks in the task component 502 can be indexed based upon the task keywords. The tokens contained within the query can be used to select an appropriate task or set of tasks. The application can also include additional information with the query. For example, the application could pass user context information to the framework to be used in the selection of the appropriate task. The task retrieval component 504 can use a variety of methodologies to select appropriate tasks. The task retrieval component 504 can be trained to improve performance based upon user actions and responses to the selected tasks.

In addition, the task framework 500 can include a slot-filling component 506. The slot-filling component 506 can be responsible for providing the best matching of the list of tokens from the natural language input or query with the task parameters. Typically, a slot-filling component 506 can receive a list of tokens and one or more tasks. The slot-filling component 506 can generate one or more possible mappings of the tokens to the slots of the task. The slot-filling component 506 can generate a score or rank for each of the possible mappings of tokens to task slots. The slot-filling component 506 can use a mathematical model, algorithm or function to calculate a score or rank for mappings. The slot-filling component 506 can utilize a heuristic function, a hidden Markov model, a Naïve Bayes based model, Maximum Entropy/Minimum Divergence Models (MEMD), blending strategies, linear discriminative models or any combination thereof to calculate a score for a mapping of tokens to a task.

The slot-filling component 506 can include a method responsible for taking the natural language input, culture information, a list of tokens, a list of named entities, a task and a predetermined maximum number of desired solutions. Culture information can include information such as the writing system and formatting utilized by the relevant culture. Named entities identify tokens with a specific meaning to the slot-filling system (e.g., Boston). The slot-filling component 506 can produce a list of up to the maximum number of requested semantic solutions with a A semantic solution representing a mapping of tokens to slots that can be used by the search engine 110.

Optionally, the task framework 500 can also include a logging component 508. Tasks can pass information or feedback to the task framework 500 after completion of the task or during task processing. The logging component 508 stores the feedback information. This information can be used to train the task framework 500 and improve system performance. The feedback from tasks can include user actions. The task framework 500 can include a defined intent interface to facilitate feedback.

In addition, the task framework 500 or the slot-filling component 506 can include one or more GlobalRecognizers that provide the ability to recognize tokens that have special meaning to the task system in general. For example, the token "Boston" has special meaning as the city of Boston, Mass. The GlobalRecognizers property provides a set of recognizer components that identify special tokens, making them available throughout the entire system and across multiple tasks. For example, there may be several tasks that utilize "city," "date" or "number" entities. Entities are a mechanism for providing type information. For example the "city" entity includes a set of annotations (e.g., "city," "place," and "town"). Occurrences of the annotations within the list of tokens indicate the likelihood of a "city" entity. GlobalRecognizers allows such entities or special tokens to be defined once rather than for each individual task.

In summary, keywords are terms that might be used to surface a task. Slots are parameter values that may or may not be filled by the user Query. Slots are uniquely specified by their Name and Type.

Additionally, preIndicators are words that might disambiguate slots by occurring before a value "to Boston" would prefer the "Arrival City" slot over the "Departure City" slot even though Boston maps to CITY and can be a value for either slot. PostIndicators are words that might disambiguate slots by occurring before a value "from Boston" would prefer the "Departure City" slot over the "Arrival City" slot even though Boston maps to CITY and can be a value for either slot. Consider the example of Table 1:

TABLE 1

```
<Task Name="ReserveFlight">
<Keywords>cheap;tickets;flights;flight;vacations</Keywords>
<Slots>
        <Slot name="Arrival City" type= "CITY">
<PreIndicators>to, going into</PreIndicators>
<PostIndicators>arrival city</PostIndicators>
</Slot>
        <Slot name="Departure City" type= "CITY">
<PreIndicators>from, originating in</PreIndicators>
<PostIndicators>departure city</PostIndicators>
</Slot>
        <Slot name="Arrival Time" type= "TIME">
<PreIndicators>arriving at</PreIndicators>
<PostIndicators>arrival time</PostIndicators>
        </Slot>
        <Slot name=" Departure Time" type= "TIME">
<PreIndicators>leaving at</PreIndicators>
<PostIndicators>departure time</PostIndicators>
        </Slot>
        <Slot name="Adults" type= "INTEGER">
<PreIndicators> </PreIndicators>
<PostIndicators> adult, adults</PostIndicators>
        </Slot>
        <Slot name="Seniors" type= "INTEGER">
<PreIndicators> </PreIndicators>
<PostIndicators>senior,seniors</PostIndicators>
        </Slot>
        <Slot name="Children" type= "INTEGER">
<PreIndicators> </PreIndicators>
<PostIndicators>children,child,kid,kids</PostIndicators>
        </Slot>
</Slots>
</Task>
```

Given the schema of Table 1, the following queries match the ReserveFlight Task:

"I want a flight from Boston with a 8:30 PM departure time with 2 adults and 1 child"

"buy a ticket from Seattle to New York leaving at 5:15 PM"

Additionally, as discussed previously, the task server 120 can employ user feedback to learn from user behavior such that if users start entering queries such as "departing Boston for Seattle" to mean "Departure City"="Boston" and "Arrival City"="Seattle". The task server 120 will automatically learn the pattern "departing <Departure City> for <Arrival City>" without needing to explicitly add new Pre or Post indicators to the task definition.

Bidding on Tasks

Referring back to FIG. 1, in one example, the system 100 is based on a closed set of tasks (e.g., predefined tasks). One or more advertiser(s) bid on task(s) via the advertiser 140. In another example, in addition to a set of predefined tasks, advertiser(s) can bid on and construct their own tasks, for example, when a suitable task does not exist.

An advantage of bidding on a task rather than keyword(s) (as in conventional systems) is that keyword bidding requires advertisers to bid on every possible city. With conventional systems, advertiser(s) are not presented with contextual information to understand the difference between "arrival" and "departure" cities. With tasks, advertiser(s) are presented with contextual information which can assist the advertiser(s) to target their advertisement(s) to particular task(s).

Task Retrieval & Matching Task Results with Advertisers

In response to a query received from a user 130, the task server 120 returns a list of the most likely task(s) given the query to the search engine 110. The search engine 110 can then provide the task(s) to the advertiser(s) 140 for review and bidding. Thereafter, zero, one or more advertiser(s) 140 can bid on the task(s), for example, with indicia that the particular advertiser 140 is willing to pay for the right to display an ad based, at least in part, on the task(s) (e.g., amount of money, credits and the like).

The advertiser(s) 140 can also provide information regarding advertisement(s) that are to be displayed to the user 130, in the event that the advertiser 140 is a successful bidder on the task. For example, the advertiser 140 can use an identifier to select from stored advertisements accessible by the search engine 110. Additionally and/or alternatively, the advertiser 140 can dynamically provide advertisement(s) that are to be displayed to the user 130, in the event that the advertiser 140 is a successful bidder on the task. Information received from advertiser(s) 140 is discussed in greater detail below.

Advertisement Display

When the task is returned from the task server 120, the advertisement may not be ready for display for various reasons. In one example, the task can be an XML packet which is sent to advertiser(s) 140 by the search engine 120. Advertiser(s) 140 that desire to bid on the task can then send back a data packet (e.g., HTML) that includes information to be displayed to the user 130, in the event the advertiser 140 is a successful bidder.

In this example, suppose the ReserveFlight Task is returned by the task server 120 based on the query "flight to Boston from Seattle" and that three advertisers 130 have bid on the task. Advertising logic of the search engine 110 can determine that all of these advertisers should be notified. Accordingly, the search engine 110 can send an XML packet to each of the advertisers 140, for example:

```
<TaskResult Name="ReserveFlight">
    <Parameters>
        <Parameter Name ="Arrival City" Value="Boston" />
        <Parameter Name ="Departure City" Value="Seattle" />
    </Parameters>
</TaskResult>
```

This packet is underspecified with respect to all of the information that's potentially accessible through the task definition: the number of tickets and dates were not provided.

The advertisers 140 can then return an HTML blob containing whatever information they deem relevant given the task. For example, a particular advertiser 140 might include a banner ad with parameters embedded in the links so that the site can be pre-populated with information if the user clicks it. A second advertiser 140 might query their database to return instances of flights so that they can display "flights leaving tomorrow starting at $299" or display a list of flights to the user. Yet other advertisers 140 might choose not to display anything either because supply is limited or for other reasons. Significantly, the advertiser 140 controls the content that's display in this example. Optionally, due to latency issues with farming out the task results to the advertisers 140, the search engine 110 can choose to return a page to the user 130 with static advertisements and then asynchronously populate the user's view as the search engine 110 receives results from the advertisers 140.

In another example, a link (e.g., URL) can be constructed by the search engine 110 without having to contact the advertiser(s) 140 directly. In this example, the, the advertiser is responsible for filling out a template such that the results cab be rendered by the search engine 110. For example, for the ReserveFlight Task, the results template can contain results of the form {Arrival City, Departure City, Arrival Time, Departure Time, Ticket Price, Availability} or anything else for that matter. Given a common result format, the search engine 110 can render the results in a consistent manner and in accordance with their look and feel. Significantly, in both examples, the advertiser 140 can be notified about the semantics of the query and therefore is able to provide more targeted advertisements.

Feedback: Closing-the-loop

As discussed previously, the task retrieval process of the task server 120 can improve with user feedback. For example, feedback can be based on the click-through data stage (e.g., which advertisement was selected by the user 130). Additionally and/or alternatively, feedback can be based on intent data, that is, what the user 130 did once they receive the advertiser 140's advertisement.

The click-through data can be obtained by logging which advertisement was clicked and whether it was the last advertisement clicked. A query classifier model can then be built that attempts to surface the best tasks given the query. This can be expressed mathematically using the Naïve Bayes approximation as $P(Task|Query) \sim P(Task) * \Pi P(term|Task)$. Those skilled in the art will recognize that there are many other mathematical approaches that can be used to obtain this approximation and all such mathematical approaches are intended to be encompassed by the hereto appended claims.

Additionally, intent data can be employed to train the slot-filling models that determine the best mapping (e.g., flights departing Boston for Seattle" is "flights departing <Departure City> for <Arrival City>"). For example, this information can be supplied by the advertiser in an intent packet such as:

```
<Intent Query="departing Boston for Seattle"
TaskName="ReserveFlight">
  <IntentConditions>
    <IntentCondition SlotName="Departure City" SlotType="CITY" SlotValue="Boston" />
    <IntentCondition SlotName="Arrival City" SlotType=" CITY" SlotValue="Seattle" />
  </IntentConditions>
</Intent>
```

In order to obtain this feedback data from the advertiser(s) 140, the search engine 110 can provide financial incentives to the advertiser(s) 140.

It is to be appreciated that the system 100, the search engine 110, the task server 120 and/or the advertiser(s) 140 can be computer components as that term is defined herein.

Figure 6:
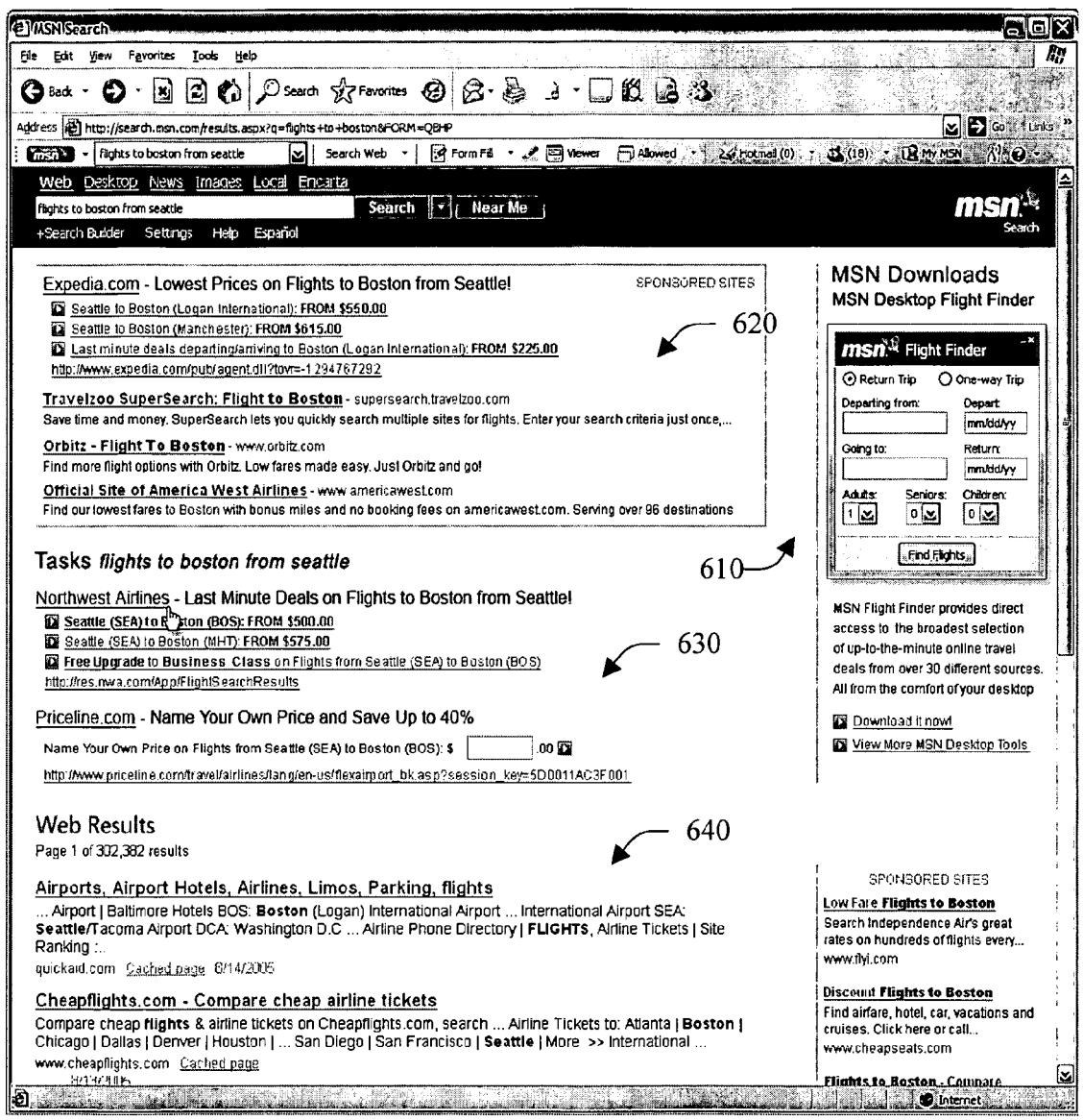
FIG. 6 is a screen shot of an exemplary user interface.

Referring next to FIG. 6, an exemplary user interface 600 is illustrated. The user interface 600 displays results from the search engine 110 based on a user's query. In this example, the user interface 600 includes a first advertisement area 610, a second advertisement area 620 and a third advertisement area 630. Inclusion in one or more of these areas 610, 620 and 630 can be based, for example, upon successful bidding of advertiser(s) 140 to task(s) retrieved by the task server 120. A web results area 640 is also included in the exemplary user interface 600.

Figure 7:
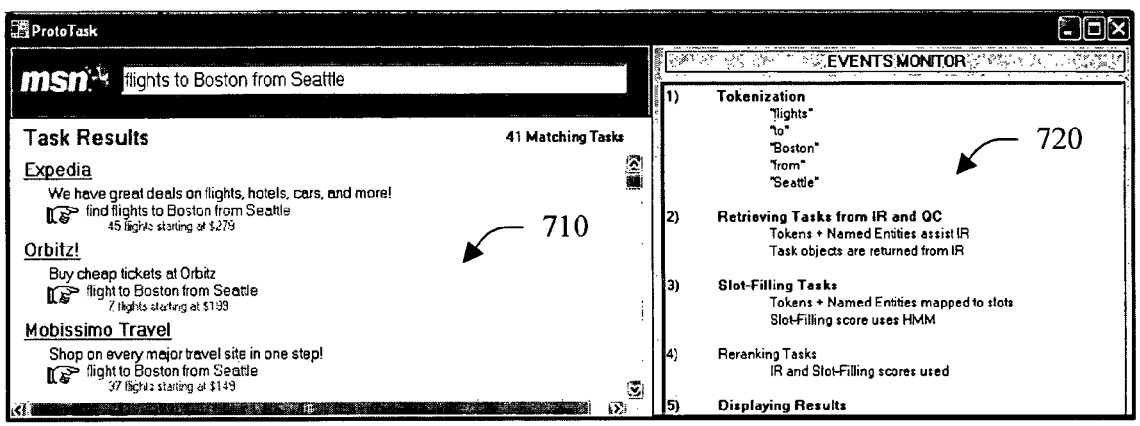
FIG. 7 is a screen shot of an exemplary user interface.

Turning briefly to FIG. 7, an exemplary user interface 700 is illustrated. The user interface 700 displays results from the search engine 110 based on a user's query. The user interface 700 includes a task results area 710 in which one or more advertisement(s) can be displayed. The user interface 700 further includes an events monitor area 720 which displays information obtained from the task server 120 related to the query.

Turning briefly to FIGS. 8-12 methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 8:
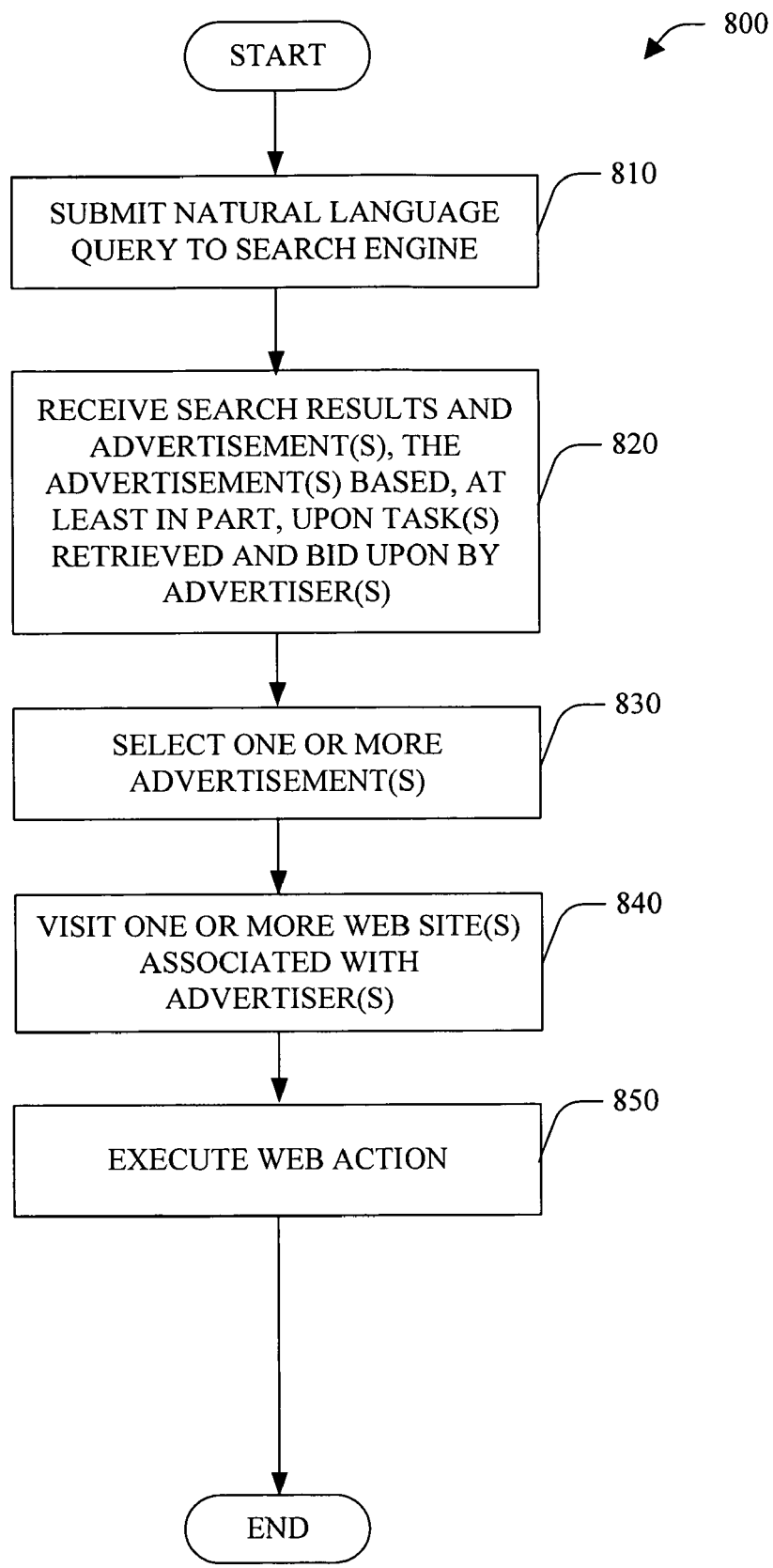
FIG. 8 is a flow chart of a method facilitating a user query session.

Referring to FIG. 8, a method facilitating a user query session 800 is illustrated. At 810, a user submits a natural language query to a search engine. For example, the user can submit a query such as "flights to Boston from Seattle with 2 kids". The query is sent to the search engine and, optionally, additional information can be sent to the search engine, for example, implied from the user's profile and/or location obtained through various techniques.

At 820, the user receives search results and associated advertisement(s), the advertisement(s) based, at least in part, upon task(s) retrieved and bid upon by advertiser(s). At 830, the user selects one or more of the advertisement(s) (e.g., clicks-through) and is brought to the advertiser's site. At 840, the user visits one or more web site(s) associated with advertiser(s). For example, parameter value(s) can be filled-in and the page can be populated with results based on the retrieved task(s) (e.g., richer semantic information available than with conventional systems). At 850, the user executes a web action. As discussed previously, the user web action can provided to as feedback to the task server.

Figure 9:
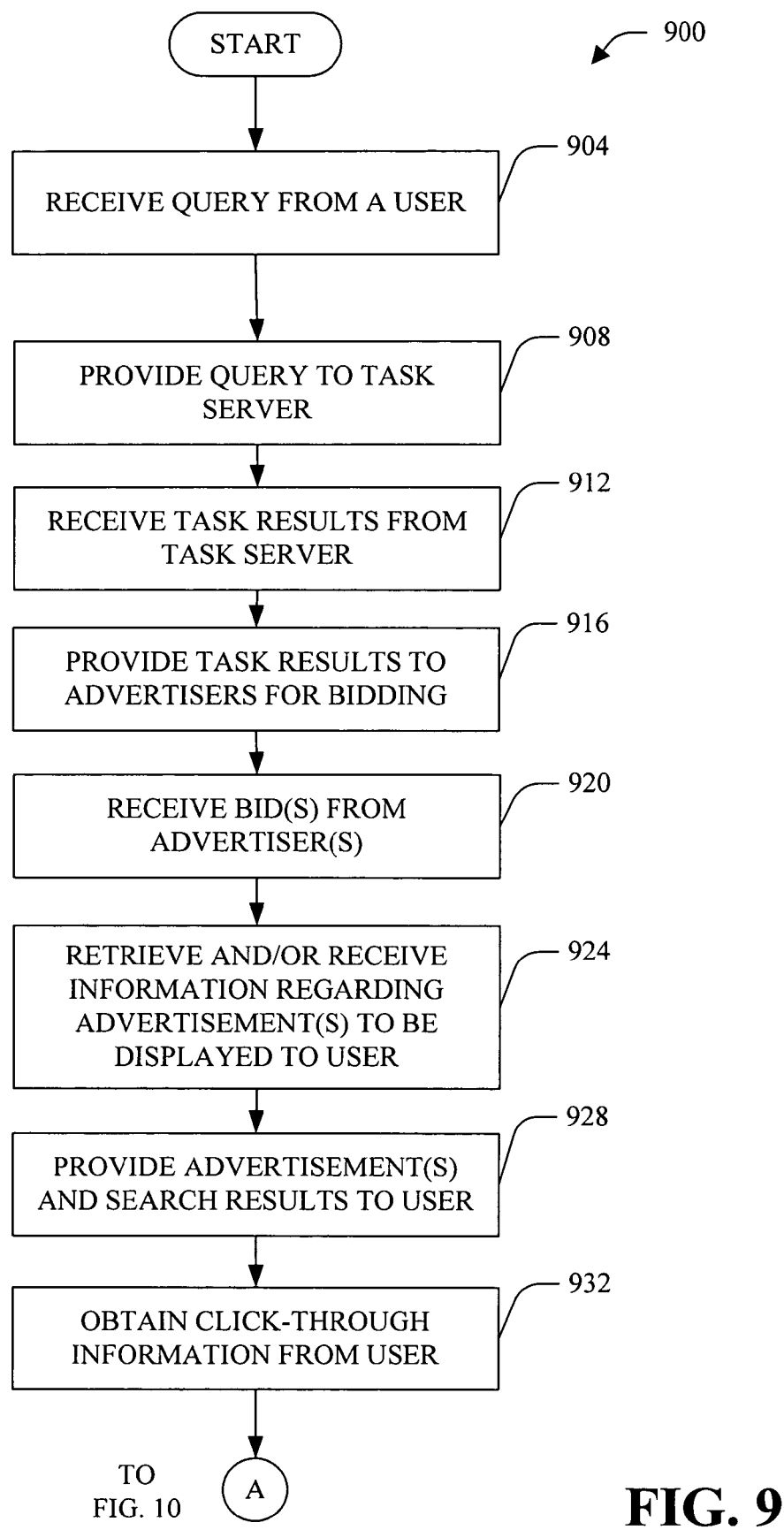
FIG. 9 is a flow chart of a search engine method.
Figure 10:
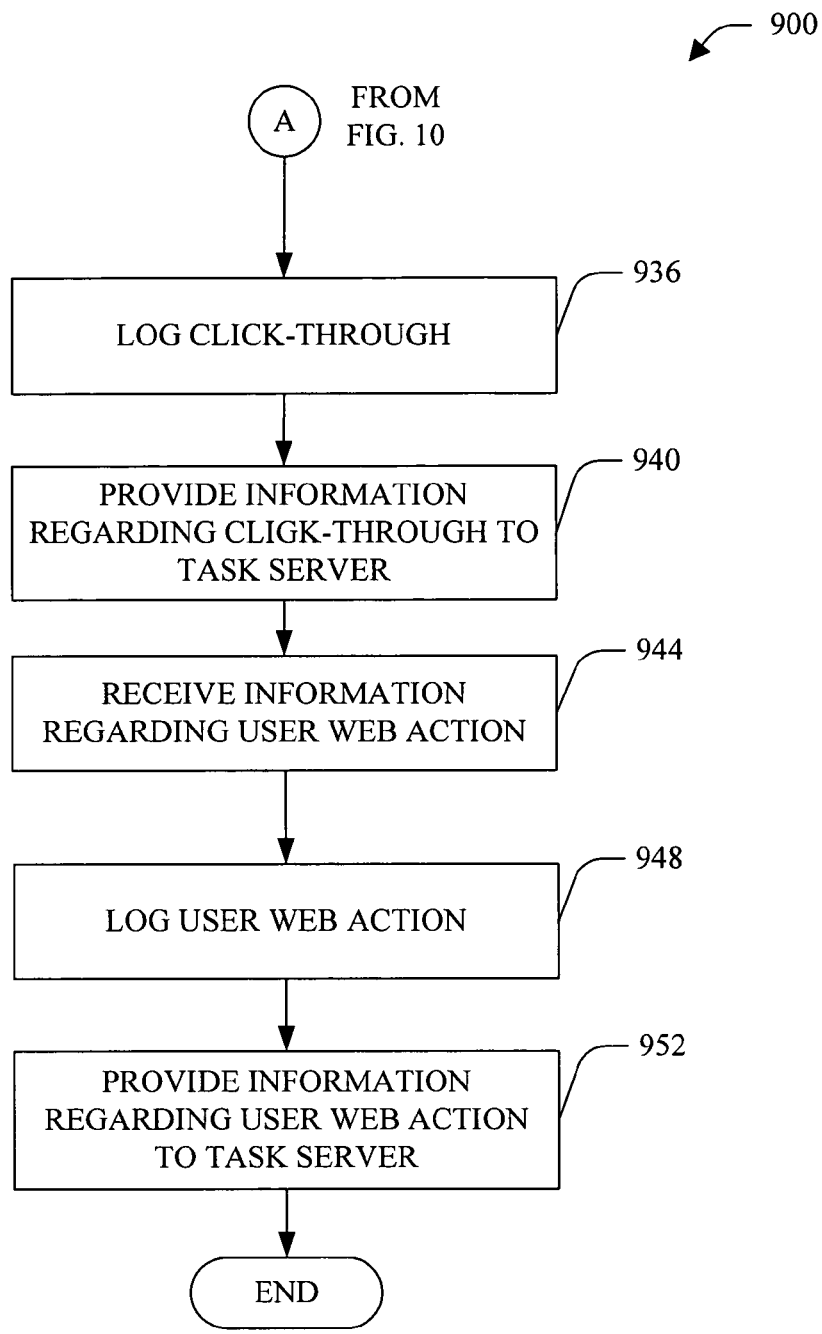
FIG. 10 is a flow chart further illustrating the method of FIG. 9.

Next, referring to FIGS. 9 and 10, a search engine method 900 is illustrated. At 904, a query (e.g., natural language query) is received, for example, from a user. At 908, the query is provided to a task server. At 912, task results are received from the task server.

At 916, advertiser(s) are provided the task results for bidding. At 920, bid(s) are received from the advertiser(s). At 924, information regarding advertisement(s) to be displayed to the user is retrieved and/or received, as discussed previously. At 928, advertisement(s) and search results are provided to the user.

At 932, click-through information is received from the user. At 936, the click-through information is logged. At 940, information regarding the click-through is provided to the task server (e.g., to be employed as feedback to update a query classifier model. At 944, information regarding a user's web action is received (e.g., from the advertiser selected by the user). At 948, the user web action is logged (e.g., for billing purposes). At 952, information regarding the user web action is provided to the task server (e.g., to be employed as feedback to update slot-filling model(s).

Figure 11:
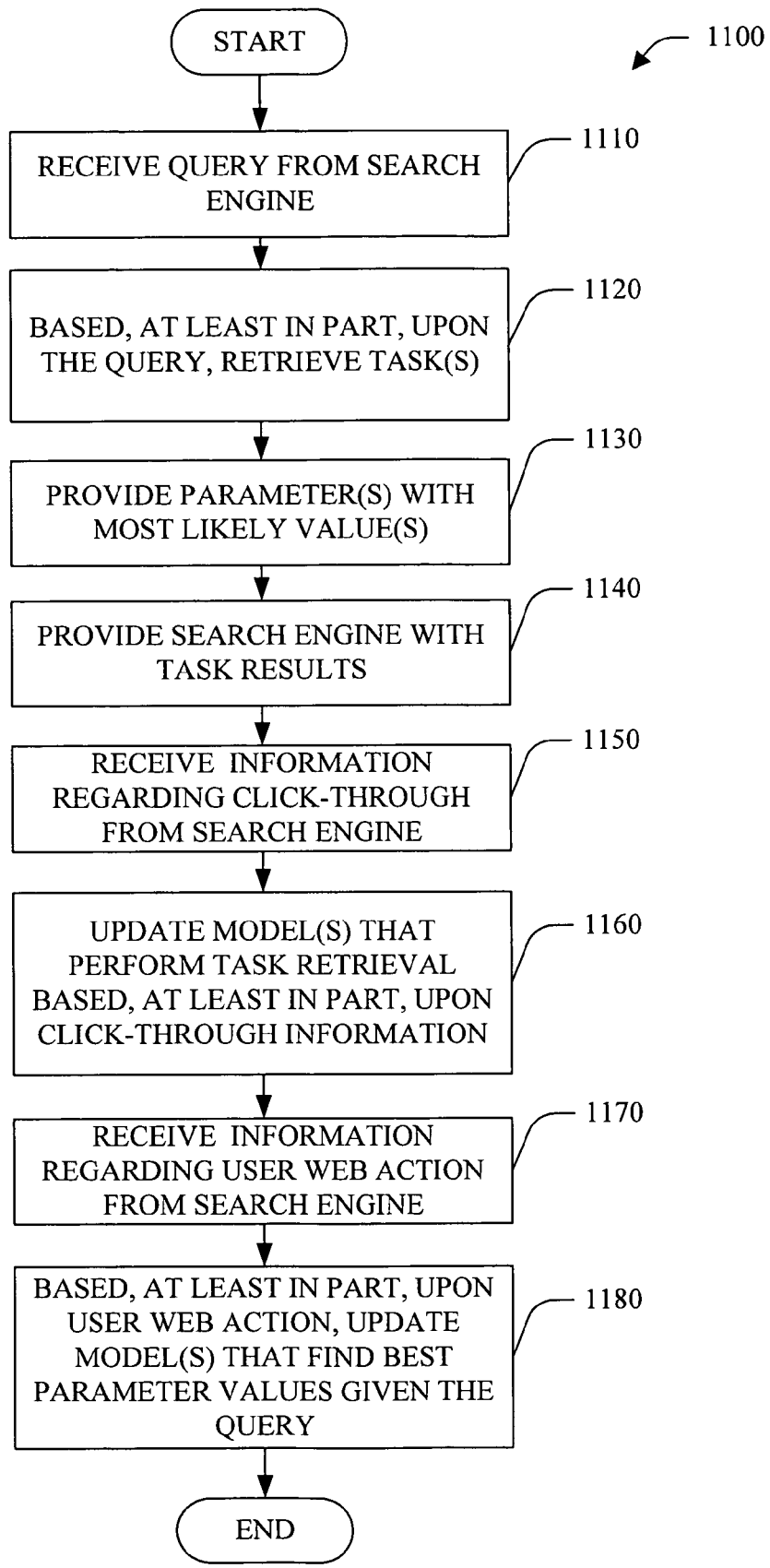
FIG. 11 is a flow chart of a task server method.

Turning to FIG. 11, a task server method 1100 is illustrated. At 1110, a query (e.g., natural language query) is received from a search engine. At 1120, based at least in part, upon the query, task(s) are retrieved. For example, when a user submits a query such as "flights to Boston from Seattle with 2 kids", a ReserveFlight Task with parameter values "Arrival City"="Las Vegas" and "Departure City"=<whatever location was found> can be retrieved. A set of likely task(s) can be identified by a task server, for example, using a combination of Information Retrieval (IR) and Query Classifier (QC) algorithms. At 1130, task parameter(s) are provided with most likely value(s) (e.g., based on the particular task and query). For example, given the most likely set of task(s), the "best-guess" slot values can be calculated using a variety of statistical and heuristic methods.

At 1140, the search engine is provided with the task results. At 1150, information regarding user click-through is received from the search engine. At 1160, model(s) that perform task retrieval can be updated based, at least in part, upon click-through information. At 1170, information regarding a user web action is received from the search engine. At 1180, model(s) that find best parameter values given a query are updated based, at least in part, upon the user web action.

Figure 12:
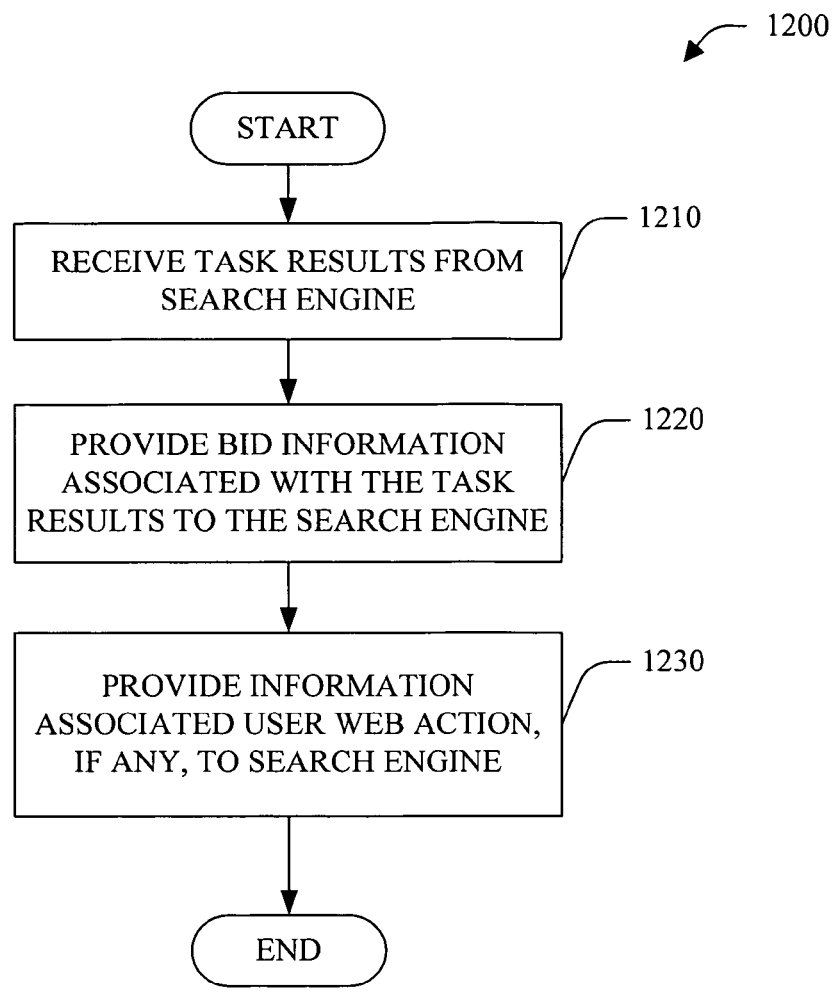
FIG. 12 is a flow chart of an advertiser method.

Referring to FIG. 12, an advertiser method 1200 is illustrated. At 1210, task results are received from a search engine. At 1220, bid information associated with the task results is provided to the search engine. At 1230, information associated with a user web action, if any, is provided to the search engine.

Figure 13:
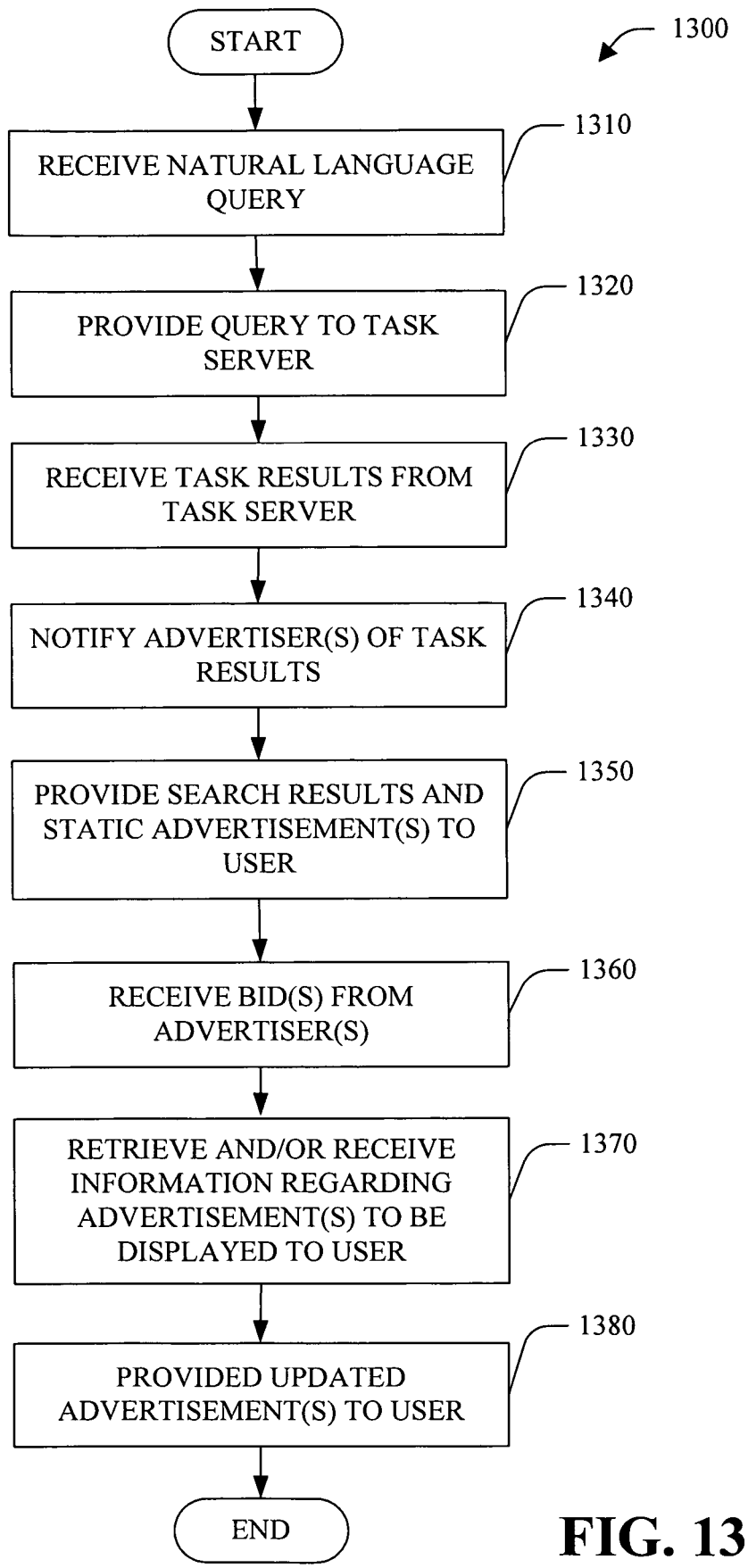
FIG. 13 is a flow chart of a search engine method.

Next, turning to FIG. 13, a search engine method 1300 is illustrated. At 1310, a natural language query is received (e.g., from a user). At 1320, the query is provided to a task server. At 1330, task results are received from the task server.

At 1340, advertiser(s) are notified of the task results. At 1350, search results and static advertisement(s) are provided to the user. At 1360, bid(s) are received from advertiser(s). At 1370, information regarding advertisement(s) of the successful bidder(s) is retrieved and/or received. At 1380, updated advertisement(s) are provided to the user.

Figure 14:
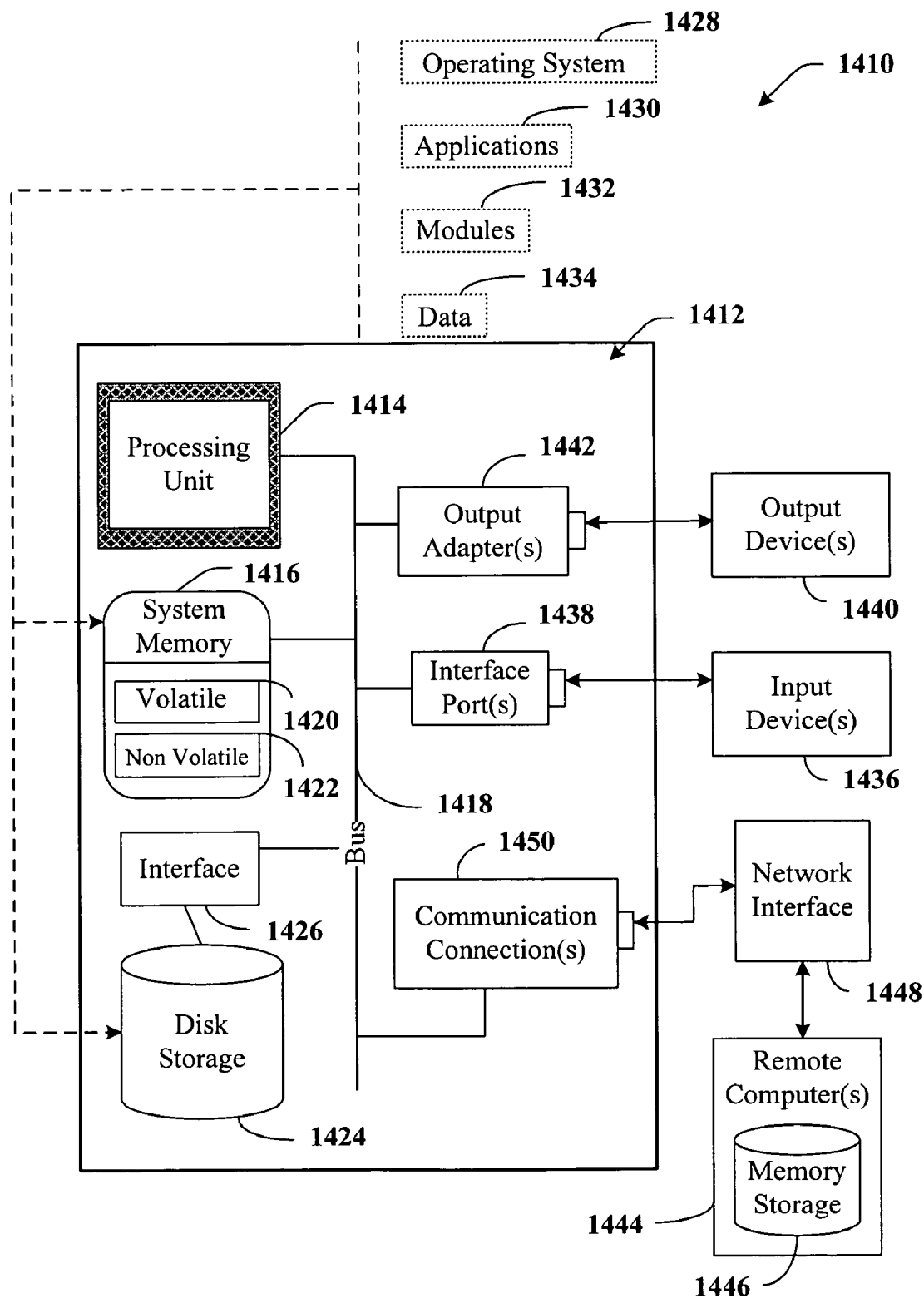
FIG. 14 illustrates an example operating environment.

In order to provide additional context for various aspects of the claimed subject matter, FIG. 14 and the following discussion are intended to provide a brief, general description of a suitable operating environment 1410. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440.

Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A task-based advertisement system comprising a computer that comprises a processor that executes computer-executable instructions that cause the computer to implement a task server that:
   selects, based upon the tokens in a query from a user, a task from among a plurality of tasks, each task in the plurality of tasks being an action relevant to users of a search engine, each task in the plurality of tasks specifying multiple slots that define parameters of the task into which tokens in queries can be filled;
   after selecting the task, generates a semantic solution that represents a mapping between the slots of the task and tokens in the query that fill the slots of the task,
   wherein the task server generates the semantic solution at least in part by:
      identifying an annotation token among the tokens in the query, the annotation token being a token that indicates a significance of a subject token, the subject token being another one of the tokens in the query; and
      determining, based at least in part on the significance of the subject token, whether the subject token should be mapped in a given one of the slots of the task; and
   after generating the semantic solution, provides data representing the task, along with the semantic solution, to search engine, wherein the search engine provides the task to an advertiser computer that determines whether to make a bid on the task based at least in part on the semantic solution.

2. The task-based advertisement system of claim 1,
   wherein the task server selects a selected group of tasks from among the plurality of tasks based upon the tokens in the query,
   wherein each task in the selected group of tasks is respectively associated with one or more keywords,
   wherein each of the keywords associated with the tasks in the selected group of tasks are weighted, and
   wherein the task server ranks the tasks in the selected group of tasks based on the weights of the keywords associated with the tasks in the selected group of tasks, the task selected by the task server being the task in the selected group of tasks having the highest rank.

3. The task-based advertisement system of claim 1, wherein the query is a natural language query.

4. The task-based advertisement system of claim 1, wherein the search engine further provides, in response to the query, a targeted advertisement to the user based in part on information received from the advertiser.

5. The task-based advertisement system of claim 1, wherein the bid represents a monetary amount to be paid in the event the search engine provides an advertisement associated with the advertiser to the user.

6. The task-based advertisement system of claim 1, wherein the task comprises a name, a title, a description, and a keyword.

7. The task-based advertisement system of claim 5,
   wherein the task server selects the task using a query classifier model; and
   wherein the task server employs click-through information to update the query classifier model, the click-through information regarding a selection, by the user, of the advertisement.

8. The task-based advertisement system of claim 1,
   wherein the task server generates the semantic solution using a slot-filling model; and
   wherein the task server updates the slot-filling model based on information regarding a user web action.

9. The task-based advertisement system of claim 1, wherein the advertiser provides advertisement information to the search engine, the advertisement information regarding an advertisement that is to be provided to the user in the event that the advertiser is a successful bidder on the task.

10. The task-based advertisement system of claim 9, the advertisement information comprising an identifier employed by the search engine to locate the advertisement, the advertisement accessible by the search engine.

11. The task-based advertisement system of claim 9, the advertiser dynamically providing the advertisement information to the search engine.

12. The task-based advertisement system of claim 1, the task comprising an XML packet which is sent to the advertiser by the search engine.

13. The task-based advertisement system of claim 1, the bid comprising an HTML data packet.

14. A search engine method comprising:
receiving, by a computer, a user query from a user of a search engine;
providing, by the computer, a task query and contextual information to a task server, the task query and the contextual information based at least in part on the user query;
receiving, by the computer, data representing a task from the task server, the task being an action relevant to the user of the search engine, the task including a semantic solution that comprises mappings between slots of the task and tokens in the user query the tokens including at least an annotation token and a subject token, the slots including a given slot, the semantic solution comprising a mapping between the subject token and the given slot when the annotation token indicates that the subject token is likely relevant to the given slot, each of the slots defining a parameter of the task into which one or more tokens in user queries can be filled;
providing, by the computer, the task to advertisers;
receiving, by the computer, bids on the task from at least some of the advertisers; and
providing, by the computer, a page to the user as a response to the user query, the page containing search results and an advertisement, the search results responsive to the user query, the advertisement associated with a successful one of the bids.

15. The method of claim 14, further comprising:
after receiving the bids, retrieving, by the computer, information regarding the advertisement from one of the advertisers.

16. The method of claim 14, further comprising:
obtaining, by the computer, click-through information from the user;
logging, by the computer, the click-through information; and
providing, by the computer, the click-through information to the task server, the task server using the click-through information to select tasks in response to receiving task queries.

17. The method of claim 14, further comprising:
receiving, by the computer, information regarding a user web action;
logging, by the computer, the user web action; and
providing, by the computer, information regarding the user web action to the task server, the task server using the information regarding the user web action to generate one or more potential mappings between tokens in queries and slots of tasks.

18. An advertiser method comprising:
receiving, by a computer, an XML packet from a search engine, the XML packet representing a task, the task being an action relevant to a user who submitted a user query to the search engine, the XML packet comprising a title of the task and a description of the task, the task including a semantic solution that represents a mapping between slots of the task and tokens in the user query that fill the slots of the task, each of the slots defining a parameter of the task into which one or more tokens in user queries can be filled, each of the slots having a slot name that identifies the slot and a slot type that identifies a type of value in the slot;
based at least in part on the semantic solution, determining, by the computer, whether to make a bid on the task;
when a determination is made to make the bid on the task, providing, by the computer, bid information to the search engine, the bid information indicating the bid;
dynamically generating, by the computer, an HTML data packet based at least in part on a given token, the HTML data packet representing an advertisement to be displayed to the user, the given token being one of the tokens mapped to the slots of the task;
embedding, by the computer, a parameter value in a link to a site, the link contained in the HTML data packet, the parameter value corresponding to the given token;
providing, by the computer, the HTML data packet to the search engine;
receiving, by the computer, a request for the site from the user, the request including the parameter value;
in response to receiving the request for the site:
automatically populating, by the computer, a field in the site with the parameter value; and
after populating the field, sending, by the computer, the site to the user.

19. The method of claim 18, further comprising:
providing information associated with a user web action to the search engine.

* * * * *